UNITED STATES PATENT OFFICE.

JEAN H. L. DE BATS, OF STONEHAM, MASSACHUSETTS, ASSIGNOR TO NEW PROCESS METALS CORPORATION, OF WILMINGTON, DELAWARE, A CORPORATION OF DELAWARE.

GRAPHITE MOLD.

1,359,156.     Specification of Letters Patent.     Patented Nov. 16, 1920.

No Drawing.     Application filed July 30, 1919. Serial No. 314,362.

*To all whom it may concern:*

Be it known that I, JEAN H. L. DE BATS, a subject of the Kingdom of the Netherlands, residing at Stoneham, county of Middlesex, Commonwealth of Massachusetts, have invented certain new and useful Improvements in Graphite Molds, of which the following is a specification.

My invention consists in a mold adapted for use in casting metals. Molds have heretofore been made of various materials, including powdered graphite and a combination of graphite and clay. None of such molds, in practice, are found suitable for casting metals at high temperatures, owing to the fact that they usually decompose, break down, or set free gases and bodies which are absorbed by the metal cast.

My improved mold is not open to the objections above stated. To produce my mold, I take pure flaked graphite and compress it to the shape desired in a suitable metal mold. The pressure used should be as great as may be conveniently applied; the greater the pressure the better the mold. In practice I have used a pressure of from one to two tons, with success. After the graphite mold has been made, it is removed from the metal mold and is then ready to receive the metal to be cast. I have cast into said mold, high speed steel, copper, nickel, glass, and various combinations of metals and other bodies, and with entire success. The cast articles are sharp, have a high surface finish, and are true to form. Shrinkage or expansion is dependent, of course, upon the composition, but relatively less than similar bodies cast in ordinary molds.

Having thus described my invention, I claim:

1. A mold formed of compressed flaked graphite.

2. A mold formed of flaked graphite consolidated by the exhibition of high pressure.

3. A mold formed of graphite which may be consolidated to form a homogeneous structure without intervening spaces.

In testimony whereof, I affix my signature.

JEAN H. L. DE BATS.